United States Patent [19]

Zavasnik

[11] 3,878,033

[45] Apr. 15, 1975

[54] FORMING PARISONS WITH NUCLEATED INNER LAYER

[75] Inventor: Frederick Zavasnik, Chicago, Ill.

[73] Assignee: Phillips Petroleum Company, Bartlesville, Okla.

[22] Filed: Mar. 10, 1971

[21] Appl. No.: 122,673

Related U.S. Application Data

[62] Division of Ser. No. 855,801, Sept. 8, 1969, Pat. No. 3,600,487.

[52] U.S. Cl. .................. 428/36; 138/137; 156/244; 264/95; 264/98; 428/212; 428/215; 428/516
[51] Int. Cl. ...... B32b 7/02; B29d 23/04; F16l 11/04
[58] Field of Search ..... 138/137; 156/244; 161/165, 161/252, 139, 166; 260/94.9 GD; 264/95, 98

[56] References Cited
UNITED STATES PATENTS

| | | | |
|---|---|---|---|
| 2,932,323 | 4/1960 | Aries | 138/137 |
| 3,140,004 | 7/1964 | Schaich | 215/1 |
| 3,207,739 | 9/1965 | Wales | 260/93.7 |
| 3,367,926 | 2/1968 | Voeks | 260/93.5 |

Primary Examiner—Charles E. Van Horn
Assistant Examiner—Robert A. Dawson

[57] ABSTRACT

Tubular parisons suitable for blow molding into high strength transparent hollow objects are formed having a thin inner layer of nucleated polypropylene and a thicker outer layer of polypropylene containing no nucleating agent.

8 Claims, 3 Drawing Figures

PATENTED APR 15 1975      3,878,033

INVENTOR.
FREDERICK ZAVASNIK

BY Young + Swigg

ATTORNEYS

FORMING PARISONS WITH NUCLEATED INNER LAYER

CROSS REFERENCE TO RELATED APPLICATIONS

This application is a divisional of pending application Ser. No. 855,801, filed Sept. 8, 1969 now U.S. Pat. No. 3,600,487.

BACKGROUND OF THE INVENTION

This invention relates to the fabrication of improved preformed parisons for blow molding to clear, high strength, hollow articles.

It has been found that blow molded articles of exceptional strength and clarity can be produced by forming a tubular parison, cooling said parison to a temperature well below its crystalline melting point, and thereafter reheating said parison to a point just below its crystalline melting point at which temperature it is stretched longitudinally and expanded by internal fluid pressure to conform to mold walls. The resulting product has high strength because of the molecular orientation imparted by stretching at this temperature, and further, has improved clarity as compared with conventionally blown bottles and the like. It has been found that while bottles and the like formed in this manner have exceptional clarity and sparkle, these optical properties can be enhanced yet still further to give a product which is essentially crystal clear by the addition of a small amount of a nucleating agent. However, it has been found that some nucleating agents tend to degrade the polymer, or perhaps, tend to interfere with the stabilizing effect of additives in the polymer.

Also, there is certain difficulty inherent in this technique in that the quality of the final article is determined somewhat by the surface characteristics of the parison. The outer surface of the parison can easily be quenched by contact with a cold metal surface or by contact with water to give a crystal structure and surface which will result in a clear, glossy surface on the outside of the resulting article. Also, the outer surface of the parison is formed by forcing it out against a smooth-walled sizing tube, and therefore, is mechanically smoothed. However, the inner surface of the parison cannot be cooled and smoothed in this manner without the utilization of complicated and unreliable equipment. Somewhat improved internal melt surface characteristics are obtained by using higher melt flow polymer, but this frequently results in a poorer surface on the outside, presumably as a result of the higher melt flow polymer having a tendency to be scratched or marred by contact with metal surfaces during the heating and fabrication operations since it tends to be relatively more sticky than low melt flow material and because, especially on slow cooling, the high melt flow material tends to crystallize with the formation of large spherulites so that even though the surface is physically smooth, the resulting article has imparted to it the poor optical properties associated with large spherulitic crystal structure.

SUMMARY OF THE INVENTION

It is an object of this invention to provide an improved parison for blow molding into hollow objects;

It is a further object of this invention to provide a parison having enhanced surface characteristics on the interior thereof;

It is a further object of this invention to provide a parison having enhanced optical properties without any sacrifice in the physical properties of the parison or the resulting final product; and It is yet a further object of this invention to make possible the production of blow molded hollow articles having exceptional clarity and outstanding mechanical properties.

In accordance with this invention, a parison preform is fabricated having a thin inner surface of nucleated polypropylene and a thicker outer layer of polypropylene containing no nucleating agent.

BRIEF DESCRIPTION OF THE DRAWINGS

In the drawings forming a part hereof, wherein like reference characters denote like parts in the various views.

DESCRIPTION OF THE PREFERRED EMBODIMENTS

Figure 1:
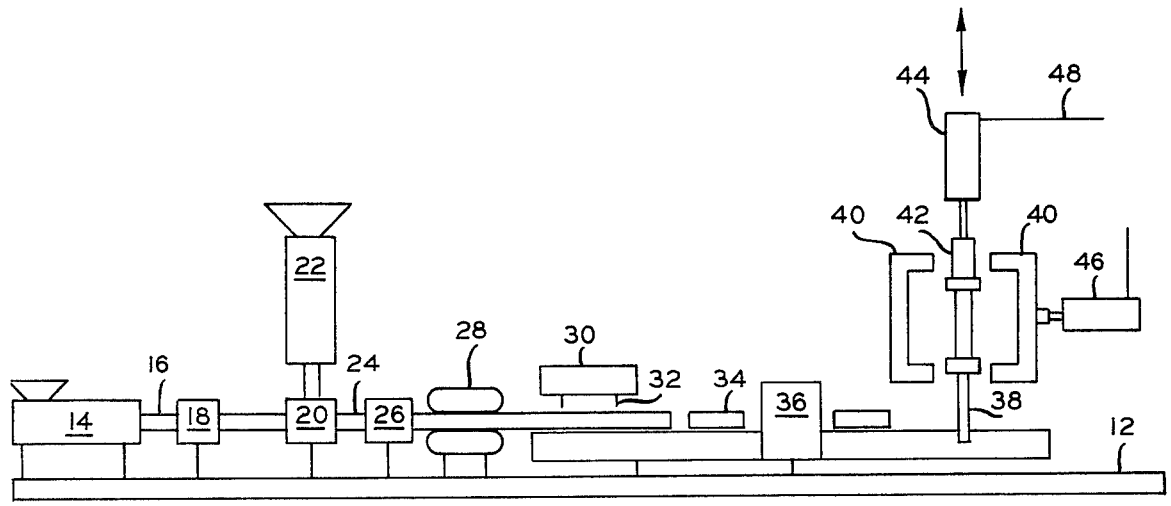
FIG. 1 is a schematic representation of forming parison preforms and thereafter fabricating them into hollow objects.

Both the inner and outer layer of the parisons of this invention are formed from polypropylene. The polypropylene forming the inner layer contains a nucleating agent in a concentration within the range of 0.005 to 1, preferably 0.01 to 0.05, weight percent based on the weight of the polymer. The polypropylene forming the outer layer contains no nucleating agent. Antioxidants, UV stabilizers, heat stabilizers, and the like may be incorporated into the polypropylene forming the outer layer. While the inner layer will generally contain such additives also, such is not essential because mechanical properties of the over all laminate will not be effected appreciably by embrittlement which might occur in the inner layer; and in addition, some nucleating agents tend to interfere with the action of stabilizer systems. Also, some stabilizer systems such as those containing calcium stearate interfere with the action of the nucleating agent.

Any of the nucleating agents known in the art can be used in the inner layer. Exemplary of these are carboxylic acids such as benzoic acid, sodium salts of dicarboxylic acid-type compounds, benzoic acid-type compounds, and arylalkanoic acid-type compounds such as are disclosed in Wales, U.S. Pat. No. 3,207,739. Voeks, U.S. Pat. No. 3,367,926, also discloses numerous suitable nucleating agents.

Some improvement in the surface characteristics of the polymer can be achieved by utilizing a higher melt flow polymer. However, if it is desired to reheat the parison to orientation temperature by means of placing the parison in a heated block where there is direct contact between the parison and the block, it has been found that the higher melt flow polymers which tend to give a smoother inner surface are more easily scratched during the heating step, and thus give an inferior outer surface. In addition, the higher melt flow polymers would give slightly poorer mechanical properties such as impact strength in the ultimate article; and, because of the tendency of high melt flow polymers to form larger crystal structures, the beneficial effect of the smoother surface on the optical properties is outweighed by the presence of spherulites. At any rate, in a preferred embodiment of this invention, the inner layer containing the nucleating agent is made of a higher flow of polypropylene than the outer layer containing no nucleating agent. Suitable melt flow ranges for the inner layers are from 3 to 10 and for the outer layer, 0.5 to 2.9 (ASTM D 1238-62T, Condition L).

The orientation temperature to which the parisons are reheated preparatory to blow molding is within the range of 1° to 50° below the crystalline melting point of the polymer, preferably within 2° to 20° below. Polypropylene generally has a crystalline melting point of about 340°F; thus, the preferred orientation temperature is in the neighborhood of 320°–338°F.

The thickness of the inner layer will be between 5 and 50 mils, preferably between 9 and 15 mils. The thickness of the outer layer will be at least 60 mils and can be as high as 300 mils or higher, preferably between 100 and 150 mils. Particularly in the preferred embodiment wherein the inner layer is of a higher melt flow, the thickness must be at least 5 mils since there is more involved than just providing a "surface effect." That is, the higher melt flow polymer tends to level out unevenness in the inner surface of the outer layer in such instances. The nucleating agent prevents the formation of large crystal structures and hence the optical properties of the final article are enhanced by both the physically smoother inner surface and by the absence of large crystal structures in this layer. The outer layer is physically smoothed by the sizing bushing and has relatively small crystal structures because of the low melt flow.

The laminate can be formed as shown in the drawings by first fabricating a thin wall tube of a nucleated material and thereafter running it through a crosshead die in a manner known in the art, and extrusion coating the unnucleated outer layer over it. Such crosshead dies are conventionally used for extrusion coating wire and imparting a plastic coating to metal conduit and the like. The inner tube melts, at least along the interface with the outer layer, during this operation. Alternatively, the two layers can be extruded simultaneously from a die head having concentric annular passageways for two polymers. Such die heads are known in the art and are conventionally fed by means of utilizing a first extruder to feed the inner concentric annular extrusion die and a second extruder to feed the outer concentric extrusion die. Indeed, the die itself at the face thereof would have the same appearance as that shown in FIG. 2, except a mandrel would be present within the inner tube.

Referring now to the drawings, particularly FIG. 1, there is shown a frame 12 supporting the various pieces of equipment. First extruder 14 forms a thin wall tubular extrudate 16 of nucleated polypropylene. Extrudate 16 passes through cooling bath 18 and thence to crosshead die 20 of second extruder 22. As thin walled tubular extrudate 16 passes through crosshead die 20, there is extruded around it a thicker outer tubular layer of polypropylene containing no nucleating agent. The thus formed tubular laminate 24 passes through vacuum cooling and sizing chamber 26. Tubular laminate 24 is pulled through vacuum cooling and sizing chamber 26 by means of puller 28 which comprises two endless belts which are in frictional contact with the tubular laminate. This thus cooled and sized tubular laminate is thereafter directed through cutting mechanism 30 having knife elements 32 which sever the tubular laminate into individual work pieces (tubular parisons) 34. Parison 34 are passed through oven 36 where they are heated to orientation temperature. On emerging from the oven, they are grasped at a first end thereof by means of rotating gripping mechanism 38 and transferred to a position between mold halves 40. A second end of parison 34 is clamped by thread-forming jaw 42 and the parison, while still at orientation temperature, is stretched longitudinally by means of relative axial movement between thread-forming jaw 42 and gripping mechanism 38, for instance, by means of air cylinder 44, which move thread-forming jaw 42 upward. Mold halves 40 are then closed by the action of air cylinder means 46 and fluid pressure introduced into the interior of the parison via line 48 to expand same out into conformity with the interior forming zone of said mold halves to give a biaxially oriented, high strength, clear bottle.

Figure 2:
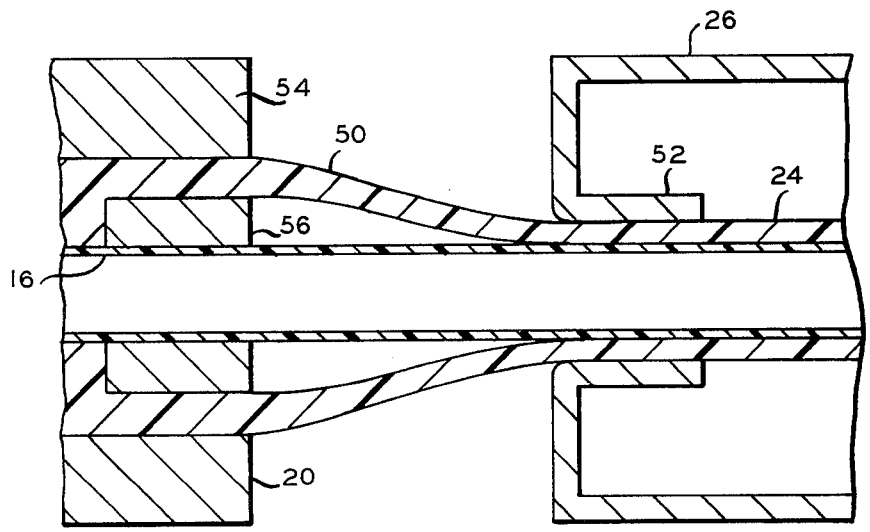
FIG. 2 is a detailed view of the die face and vacuum cooling chamber of FIG. 1.

Referring now to FIG. 2, there is shown in detail, crosshead die 20 and the initial section of vacuum cooling and sizing chamber 26. As can be seen, thin-walled tubular extrudate 16 passes through crosshead die 20 and there is extruded thereon an annular thicker tubular extrudate 50 to thus form the tubular laminate 24. As tubular laminate 24 enters vacuum cooling and sizing chamber 26, the outer surface thereof is mechanically smoother by means of bushing 52 and is cooled by means of water within chamber 26. The entire chamber is under vacuum so as to cause said tubular laminate to be maintained in intimate sliding contact with bushing 52 as it passes through the chamber. Thicker extrudate 50 is formed by the annular opening defined by outer die bushing 54 and the outer suface of concentric hollow mandrel 56. As noted hereinabove, a second mandrel could be positioned within mandrel 56 and the inner thin-walled tube formed in the annular opening defined by the inner surface of hollow mandrel 56 and the outer surface of this additional concentric mandrel (not shown).

Figure 3:
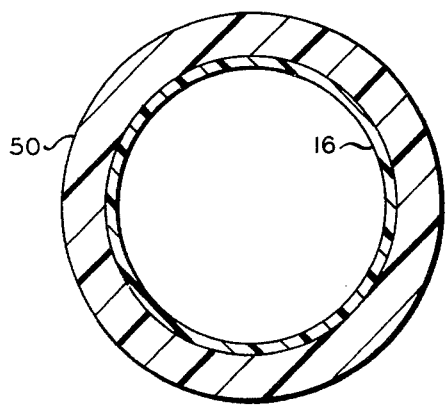
FIG. 3 is a cross-sectional view of a parison preform prepared in accordance with this invention.

FIG. 3 is a cross-sectional view of a parison formed in accordance with this invention showing the outer, thicker layer 50 of polypropylene containing no nucleating agent and the inner, thinner layer of nucleated polypropylene 16.

It is apparent that many conventional items such as temperature controllers, heaters, switches, and other mechanical elements have been omitted for the sake of simplicity, but their inclusion is understood by those skilled in the art and is within the scope of the invention.

EXAMPLE

Polypropylene homopolymer having a melt flow of 3.5 (ASTM D 1238-62T, Condition L) and a density of 0.905 (ASTM D 1505-63T) was formed into a thin-walled tube having a wall thickness of 10 mils. This tube was cooled to solidify same and passed through a crosshead die similar to that shown in the FIGURES. A 115 mil-thick layer of 0.7 melt flow (ASTM D 1238-62T, Condition L), 0.905 density (ASTM D 1505-63T) polypropylene homopolymer was extruded over said thin-walled tube in a manner similar to that shown in the drawings. The polypropylene comprising the inner layer containing 0.01 weight percent sodium benzoate nucleating agent based on the weight of the polymer.

The resulting laminate was cooled to room temperature and cut into five inch lengths which were reheated to a temperature of 320°–338°F. These reheated parisons were stretched longitudinally and placed in a molding zone and expanded to conform to the molding zone by means of internal fluid pressure to give biaxially oriented bottles. The resulting bottles were crystal clear, had tough wall sections, and were found to still possess good mechanical properties after a period of many months. The 3.5 melt flow polymer contained about 0.15 weight percent each of butylated hydroxy toluene (BHT) and dilaurylthiodipropionate (DLTDP). The 0.7 melt flow polymer contained BHT, distearylthiodipropionate, calcium stearate and 1,1,3-tris(2-methyl-4-hydroxy-5-tert-butylphenyl)butane (Topanol CA).

CONTROL 1

A tubular extrudate was formed from the identical 0.7 melt flow polypropylene of the Example except that the entire 125 mil thickness of the extrudate was made of the 0.7 melt flow polymer having no nucleating agent. This extrudate was cooled, cut into parisons, and reheated and blow into bottles in an identical manner to that used in the Example. The resulting bottles were tough, and compared with bottles formed in the conventional manner, appeared transparent. However, compared with the bottles of the Example, they were noticeably hazy, less clear, and less glossy.

CONTROL 2

A 125 mil extrudate was formed from the identical 3.5 melt flow polypropylene as the Example except containing benzoic acid as a nucleating agent. The resulting extrudate was formed into individual parisons, reheated and blow molded to give biaxially oriented bottles in a manner identical to that used in the Example. The bottles initially were clear and tough but after standing for two weeks at room temperature, the walls became brittle.

While this invention has been described in detail for the purpose of illustration, it is not to be construed as limited thereby, but is intended to cover all changes and modifications within the spirit and scope thereof.

I claim:

1. An individual preformed tubular parison comprising an inner tubular layer of polypropylene of 5–50 mils wall thickness, said polypropylene containing 0.005–1 weight percent of a nucleating agent, and an outer integrally joined layer of polypropylene, said outer layer having a thickness of 60–300 mils and said polypropylene comprising said outer layer having no nucleating agent.

2. An article according to claim 1 wherein said nucleating agent is sodium benzoate.

3. An article according to claim 1 wherein said inner layer of polypropylene has a relatively high melt flow and said outer layer has a relatively low melt flow.

4. An article according to claim 1 wherein the polymer comprising said inner layer has a melt flow within the range of 3–10 and when said polypropylene comprising said outer layer has a melt flow within the range of 0.5–2.9.

5. An article according to claim 1 wherein said inner layer has a wall thickness of 9–15 mils.

6. An article according to claim 1 wherein said outer layer has a wall thickness of 100–150 mils.

7. An article according to claim 1 wherein said nucleating agent is present in said polypropylene of said inner layer in an amount within the range of 0.01 to 0.05 weight percent based on the weight of said polypropylene.

8. An article according to claim 7 wherein said inner layer has a wall thickness of 9–15 mils and said outer layer has a wall thickness of 100–150 mils.

* * * * *